P. KESTNER.
EVAPORATING APPARATUS.
APPLICATION FILED MAY 7, 1910.
1,003,912.
Patented Sept. 19, 1911.
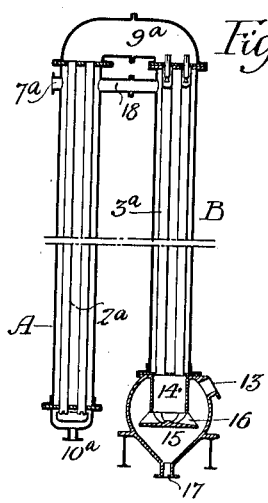
Fig. 4.
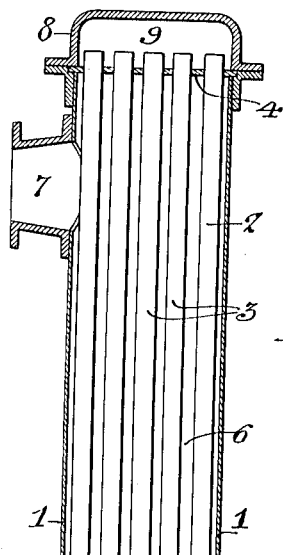
Fig. 1.
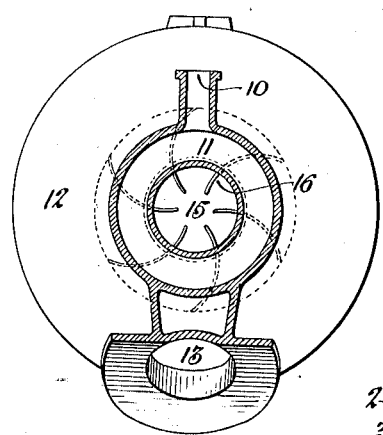
Fig. 2.
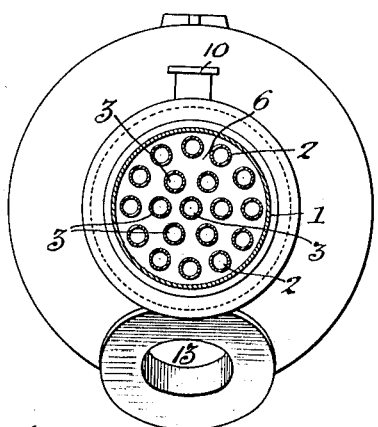
Fig. 3.
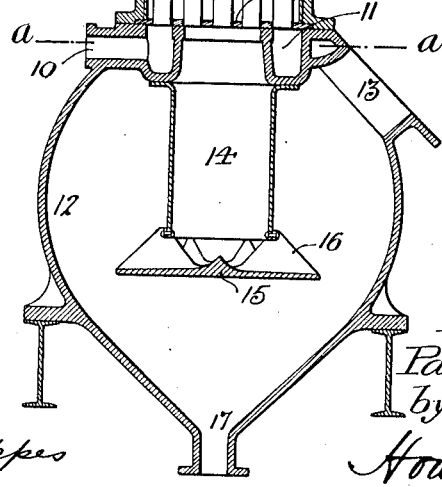
Witnesses:-
Titus H. Lowe.
Augustus B. Coppes
Inventor
Paul Kestner
by his Attorneys,
Howson & Howson

UNITED STATES PATENT OFFICE.

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

EVAPORATING APPARATUS.

1,003,912. Specification of Letters Patent. Patented Sept. 19, 1911.

Original application filed May 29, 1906, Serial No. 319,386. Divided and this application filed May 7, 1910. Serial No. 560,086.

*To all whom it may concern:*

Be it known that I, PAUL KESTNER, a citizen of the Republic of France, and a resident of Lille, Department of the Nord, France, have invented an Improved Evaporating Apparatus, (being a division of my application for patent filed May 29, 1906, Serial No. 319,386,) of which the following is a specification.

My invention relates to concentrating or evaporating apparatus, and has reference to an improved evaporator to be used for concentrating liquids, the apparatus being especially useful for liquids which are likely to be injuriously affected if allowed to remain for any length of time in stationary contact with a heated surface.

My improved evaporator is particularly applicable for carrying out the improved method or process of evaporation forming the subject-matter of my pending application before referred to, now Patent No. 965,822, dated July 26, 1910, wherein I am enabled to secure a high degree of efficiency in an economical manner.

As is well known in the practice of evaporating liquids by bringing them adjacent to or in contact with heated surfaces, better results are obtained by causing the liquid to flow in thin films or streams over said surfaces. Several attempts have been made to apply this principle in the operation of tubular evaporators, for instance, by use of the structure shown in the British patent of Lillie, No. 12,391, dated August 28, 1888.

In attempting to provide an apparatus for carrying this process into practice, however, more or less difficulty has been met with. Liquids flowing in a downward direction over heated surfaces tend to flow in streams and follow distinct paths or courses, and a portion of the evaporating surface is left naked or comparatively naked and is not utilized. To remedy this defect, it has been suggested to considerably increase the volume of liquid circulated, but as such mode of procedure involves the employment of a pump capable of circulating a much larger volume of liquid than can be concentrated in a single passage over such evaporating surface and therefore also involves employment of comparatively thick layers in lieu of films, apparatus for carrying out this method of evaporation have not been satisfactory, even with the most elaborate and ingenious arrangement of nozzles or other means for distributing the liquid to the evaporating surface or surfaces.

The improved apparatus forming the subject of my invention is of such construction as to insure, in its operation, the desired concentration of the liquid in a single passage through the same, and as mechanical elevation of the liquid is unnecessary, no pump is required.

In connection with such apparatus, it may be well to note the theory upon which the improved method or process of evaporation, before referred to, is based. This is as follows: If, instead of allowing liquid simply to flow into the upper end of a vertical tube, with or without distributing nozzles, a certain volume of steam or vapor is continuously admitted along with the liquid and admixed therewith, then said liquid will be converted into a vesicular mass and will also be, almost continuously, evenly distributed in a thin film over the whole of the interior surface of the tube and will flow with even regularity, wetting the whole surface.

In the accompanying sheet of drawings I have shown an evaporator or concentrating apparatus embodying my present invention, in which:

Figure 1, is a vertical section of one form of complete apparatus made in accordance with my invention; Fig. 2, is a cross-sectional view, taken on the line *a—a*, Fig. 1; Fig. 3, is a cross-sectional view, taken on the line *b—b*, Fig. 1, and Fig. 4, is a diagrammatic view of another form of apparatus showing a modified construction within the scope of my invention.

In Fig. 1, 1 represents a casing of suitable size in which a number of vertical tubes 2 and 3 are mounted; said tubes being disposed in two groups, the tube 2 lying adjacent the wall of the casing in a ring around the tubes 3. Plates 4 and 5 are mounted at the top and bottom of said casing to receive said tubes; said plates forming the ends of the steam or heating chamber 6. The tubes pass through and extend slightly above the upper plate 4, while their lower ends fit into the lower plate 5. Steam is introduced at 7 into the chamber 6, and the condensation therefrom may run off through a suitable outlet at the level of the lower plate, (not shown).

The casing is provided with a cap or cover 8, which with the upper plate 4, forms a chamber 9 common to both groups of tubes.

The liquid to be concentrated is fed continuously from any suitable source to the inlet 10 from which it passes into an annular chamber 11 with which the group of tubes 2, arranged adjacent the wall of the casing 1, are in communication. The liquid rises in the tubes 2 in the well known manner of film-climbing by the action of the vapor generated within the same from said liquid by the heat, being at first converted into a vesicular or foamy mass, with constantly circulating and changing bubble-walls in contact with the inner walls of said tubes, and later becoming a climbing film which overflows into the chamber 9. From the chamber 9, such liquid descends, along with the vapor formed, through the central group of tubes 3, in which it is evenly distributed in a thin film upon the whole interior surface of each tube, as explained above, without following courses, and passes with the attendant commixed vapor into a separating chamber 12 upon which the casing 1 is mounted. In lieu of this arrangement, the central group of tubes may be employed for the climbing body of liquid and the outer tubes for the descending body; the feeding and delivery ends of the respective tubes being correspondingly changed. The chamber 12 is provided with an outlet 13 for the vapor.

A tubular extension 14 forms the discharge outlet for the pipes 3; such extension being within the separating chamber and serving to direct the liquid and vapor onto a plate 15 having curved vanes 16 and forming a centrifugal separator whereby the liquid discharged upon the same is thrown outwardly against the sides of the separating chamber, while the attendant vapor escapes through the outlet 13. The concentrated liquid may be withdrawn from the separating chamber through the lower outlet 17.

As may be seen, the process carried out with my improved apparatus is a combination of two stages. In the preliminary stage, a partial evaporation is obtained in the tubes 2, in which the liquid ascends. In this stage the raising of the liquid to the top of the apparatus is accomplished, and, at the same time, the volume of vapor necessary for and essential to operation of the second and main stage of the process is formed or generated. In said second stage, the liquid flows down the tubes 3 in a continuous film, completely filming and covering the surface of said tubes with the aid of the vapor formed in the liquid, and as this is the main stage of the process, the number of tubes for the ascending liquid is only limited according to the volume of vapor required to be produced for the proper carrying out of the second and main stage of the process.

Although for the sake of simplicity it is found advantageous to arrange the tubes for the ascending liquid in the same casing as the tubes for the descending liquid, as shown in Fig. 1, of the drawings, they may be placed in separate casings; that is to say, there may be a separate evaporator for each stage; in the first of which there is provision for a preliminary or partial evaporation in which the liquid ascends and produces the necessary volume of vapor or steam, and a second with tubes for the descent of the liquid for the main stage of the process; such for instance as illustrated in Fig. 4. In this structure, A represents a casing for tubes $2^a$ in which the liquid to be concentrated ascends from an inlet $10^a$; such casing having an inlet $7^a$ for steam to circulate around said tubes $2^a$ and effect the raising of the liquid therein; means (not shown) being provided to remove the water of condensation from said casing. B is a casing containing tubes $3^a$ for the downward passage of the liquid to be concentrated; the upper ends of said casings having a communicating chamber $9^a$ whereby the liquid ascending in the tubes $2^a$ of the casing A may pass to and overflow the projecting ends of the tubes $3^a$ of the casing B. The lower ends of the tubes $3^a$ communicate with a discharge section 14 having a plate 15 with curved vanes 16 to receive the liquid whereby it is thrown against the walls of the separating chamber while the attendant vapor finds its exit through a suitable outlet such as 13; this portion of the structure being the same and operating in a manner similar to the operation of the structure shown in Fig. 1. Steam for the casing B to circulate around the tubes $3^a$ therein, may pass directly from the steam space of the casing A, through the pipe 18, as shown, or it may be supplied from an entirely independent source.

In carrying out the described process, employing either form of my improved apparatus shown, a regulated supply of liquid is admitted at the base of a narrow heated tube or series of tubes and enters into ebullition. The mixture of liquid and vapor, being specifically light rises upward, the proportion of vapor steadily increasing as the mixture rises. With a proper correlation between the supply of liquid, the size of the tube or tubes and the amount of heat supplied, the liquid in the upper part of the tube or tubes becomes merely an annular, wall-climbing film carried forward by the onrush of a central column of vapor. As the proportion of vapor to liquid increases, so of course does the speed of travel of this current of vapor, the diameter of the tube or tubes not being increased, and, concomitantly, the power of the current to maintain the travel of the film so that the film travels with substantial uniformity throughout the height of the tube or tubes. In the lowermost extremity of the tube or tubes, the entering liquid is a solid body which becomes a vesicular mass and finally is transformed into the described annular layer of liquid and center column of rushing vapor. Under these conditions, a maximum evaporative effect is secured since the climbing film is very thin and is uniformly distributed over the hot walls. The feed of liquid is, of course, so maintained that this film persists throughout the height of the tube or tubes, the feed being proportionate to the evaporation. The liquid and vapor emerge from the top of the tube or tubes with considerable velocity and in the downward progress through the next tube or series of tubes, the gravital progress of the liquid is facilitated and made uniform by the action of the vapor. Under these conditions, the liquid does not tend to follow courses or paths, as would be normal to a layer of liquid of the same thickness flowing under gravity alone, but is uniformly distributed over the tube walls. To produce these results, the conditions of heat and feed must of course be carefully regulated.

I claim:

1. In apparatus for concentrating liquids comprising two groups of long tubes mounted vertically, means for heating both groups of tubes, a feed chamber at the lower end of one group of said tubes into which liquid for ascent and concentration in said tubes is introduced, an upper chamber common to both groups of tubes, said chamber receiving all of the liquid and vapor ascending in one group of tubes and delivering the same for descent in the other group, and a separating chamber at the bottom of the apparatus communicating with the second group of tubes into which the descending liquid therefrom and accompanying vapor is discharged.

2. In apparatus for concentrating liquids comprising two groups of long vapor heated tubes mounted vertically, a shell in which both groups of said tubes are disposed and to which a heating medium is introduced, a feed chamber at the lower end of one group of said tubes into which liquid to be concentrated is introduced for ascent therein, an upper chamber carried by said tube shell and common to both groups of tubes, said chamber receiving all of the liquid and vapor ascending in one group of tubes and delivering it for descent in the other group, and a separating chamber communicating with the lower end of the second group of tubes into which the descending liquid therefrom and accompanying vapor is discharged.

3. In apparatus for concentrating liquids comprising two groups of long tubes mounted vertically for the passage of liquid in opposite directions, means for heating both groups of tubes, a feed chamber at the lower end of one group of said tubes into which liquid for ascent and concentration in said tubes is introduced, an upper chamber common to both groups of tubes, said chamber receiving all of the liquid and vapor ascending in one group of tubes and delivering the same for descent in the other group, a separating chamber communicating with the lower ends of the second group of tubes into which the descending liquid therefrom and accompanying vapor is discharged, and a vaned baffle-plate in said chamber receiving such discharge and facilitating the separation of vapor and liquid.

4. In apparatus for concentrating liquids comprising two groups of long tubes mounted vertically for the passage of liquid in opposite directions, means for heating both groups of tubes, a feed chamber at the lower end of one group of said tubes into which liquid for ascent and concentration in said tubes is introduced, an upper chamber common to both groups of tubes, said chamber receiving all of the liquid and vapor ascending in one group of tubes and delivering the same for descent in the other group, a separating chamber communicating with the lower ends of the second group of tubes into which the descending liquid therefrom and accompanying vapor is discharged, a vaned baffle-plate in said chamber receiving such discharge and facilitating the separation of vapor and liquid, and an extension common to all of the discharge ends of the second group of tubes leading to said baffle-plate.

5. In apparatus for the evaporation of liquids in transit comprising two groups of long heated tubes mounted vertically for the passage of liquid in opposite directions and having a common chamber at their upper ends, means for feeding liquid at the lower end of one group of said tubes for ascent and concentration therein, and means for withdrawing the liquid and separating the vapor therefrom at the lower end of the other group of tubes.

6. An evaporating apparatus comprising a series of long vapor-heated tubes, means for feeding liquid at the upper ends of said tubes for descent therein, said liquid being concentrated in its descent and discharging from said tubes accompanied by vapor, a chamber receiving said liquid and vapor, and a vaned baffle-plate disposed within said chamber below the discharge ends of the tubes receiving the flow therefrom and facilitating the separation of vapor from the liquid, said chamber having separate outlets for vapor and liquid.

7. An evaporating apparatus comprising a series of long vapor-heated tubes, means for feeding liquid at the upper ends of said tubes for descent therein, said liquid vaporizing and undergoing concentration in said tubes, and a baffle-plate at the lower ends of said tubes having curved vanes to impart centrifugal movement to the flow therefrom and facilitate separation of the vapor from the liquid.

8. An apparatus for concentrating liquids, comprising two groups of long tubes mounted vertically, a shell in which said tubes are disposed, means for feeding liquid to be concentrated to the lower end of one group of said tubes for ascent therein, an upper chamber carried by said shell and common to both groups of tubes, a chamber into which the liquid and accompanying vapor descending in the other group of tubes is discharged, and means for supplying said shell with heating vapor whereby both groups of tubes are heated from the same source.

9. In apparatus for concentrating liquids comprising a plurality of long tubes mounted vertically, means for heating said tubes, a feed chamber at the lower end of one of said tubes into which liquid for ascent and concentration in said tubes is introduced, an upper chamber common to both tubes, said chamber receiving all of the liquid and vapor ascending in one tube and delivering the same for descent in the other tube, and a separating chamber at the bottom of the apparatus communicating with the second tube into which the descending liquid therefrom and accompanying vapor is discharged.

10. In apparatus for concentrating liquid the combination of a group of vertical tubes; means for heating the tubes; a chamber communicating with the upper ends of the tubes; means for supplying to said chamber liquid with vapor under pressure sufficient to faciliate the filming of the liquid on the walls of said tubes, said chamber being closed to compel all of the liquid to flow into and through the tubes; and means for receiving the liquid and vapor from the bottoms of the tubes.

11. In apparatus for concentrating liquid, the combination of two groups of substantially vertical tubes, means for heating said tubes; a feed chamber at the lower end of one group of said tubes into which liquid for ascent and concentration is introduced, a chamber common to both groups of tubes placed to receive all the liquid and vapor ascending in one group of tubes and deliver the same for treatment to the other group of tubes, with a chamber into which the liquid and accompanying vapor from the second group of tubes is discharged.

12. In an apparatus for evaporating liquid, the combination of two groups of substantially vertical tubes, means for heating said tubes, means for supplying liquid to be evaporated to the tubes of one of said groups, and a device intermediate the two groups of tubes for causing the liquid to form in films on the walls of the second group of tubes after it has passed through the tubes of the first group, with a chamber for receiving liquid and vapor delivered from the second group of tubes.

13. In an apparatus for concentrating liquid, the combination of two groups of vertically mounted tubes, means for heating said tubes, means for supplying liquid to be evaporated to the tubes of one of said groups, a chamber communicating with both groups of tubes; means arranged to cause the liquid from the first group of tubes to be delivered in films upon the walls of the tubes of the second group of tubes, with a chamber for receiving liquid and vapor from the second group of tubes.

14. In an apparatus for concentrating liquid, the combination of two groups of vertical tubes, means for heating said tubes, means for supplying liquid to be concentrated to one of the groups of tubes, means interposed between said two groups of tubes for receiving the vapor and liquid films from one of the groups of tubes; means for causing the liquid to form in films on the walls of the tubes of the second group, with a chamber for receiving the liquid and vapor from said second group of tubes.

In testimony whereof, I have signed my name to this specification, in the presence of two subscribing witnesses.

PAUL KESTNER.

Witnesses:
    CHARRIER HENRI,
    LÉON PECKEL.